(12) United States Patent
Thomas

(10) Patent No.: US 7,337,579 B2
(45) Date of Patent: Mar. 4, 2008

(54) FISHING LURE

(76) Inventor: Phillip Thomas, P.O. Box 609, Stoneboro, PA (US) 16153

( * ) Notice: Subject to any disclaimer, the term of this patent is extended or adjusted under 35 U.S.C. 154(b) by 0 days.

(21) Appl. No.: 11/402,506

(22) Filed: Apr. 12, 2006

(65) Prior Publication Data

US 2006/0230670 A1    Oct. 19, 2006

Related U.S. Application Data

(60) Provisional application No. 60/671,559, filed on Apr. 14, 2005.

(51) Int. Cl.
*A01K 85/16* (2006.01)

(52) U.S. Cl. ............ 43/42.48; 43/42.32; 43/42.39

(58) Field of Classification Search ........... 43/42.48, 43/42.45, 42.47, 42.23, 42.32, 42.39
See application file for complete search history.

(56) References Cited

U.S. PATENT DOCUMENTS

| | | | | |
|---|---|---|---|---|
| 1,239,956 A | * | 9/1917 | Phinney | 43/42.48 |
| 1,338,953 A | * | 5/1920 | Odell | 43/42.48 |
| 1,394,313 A | * | 10/1921 | Leeper | 43/42.48 |
| 1,468,627 A | * | 9/1923 | Dickens | 43/42.48 |
| 1,489,207 A | * | 4/1924 | Hall | 43/42.48 |
| 1,499,689 A | * | 7/1924 | Pflueger et al. | 43/42.48 |
| 1,520,636 A | * | 12/1924 | Feiker | 43/42.48 |
| 1,639,863 A | * | 8/1927 | Sinclair et al. | 43/42.32 |
| 1,736,403 A | * | 11/1929 | Heddon | 43/42.32 |
| 1,737,683 A | * | 12/1929 | Readman | 43/42.32 |
| 2,239,404 A | * | 4/1941 | Slepica | 43/42.48 |
| 2,450,796 A | * | 10/1948 | Heimark | 43/42.47 |
| D152,243 S | * | 1/1949 | De Bay, Jr. | D22/128 |
| 2,525,733 A | * | 10/1950 | Suick | 43/42.48 |
| 2,528,861 A | * | 11/1950 | Clasen et al. | 43/42.48 |
| 2,583,616 A | * | 1/1952 | Waddell | 43/42.48 |
| 2,642,695 A | * | 6/1953 | Burns | 43/42.48 |
| 2,663,965 A | * | 12/1953 | Rosen | 43/42.39 |
| 2,817,181 A | * | 12/1957 | Bartlett | 43/42.45 |
| 2,829,462 A | * | 4/1958 | Stokes | 43/42.48 |
| 2,855,719 A | * | 10/1958 | Moser | 43/42.48 |
| 3,148,475 A | * | 9/1964 | Goodall | 43/42.48 |
| 3,264,775 A | * | 8/1966 | Nahigian | 43/42.45 |
| 3,371,444 A | * | 3/1968 | Cox | 43/42.22 |
| 3,426,467 A | * | 2/1969 | Bryant | 43/42.48 |

(Continued)

FOREIGN PATENT DOCUMENTS

DE    29813458 U1 * 11/1998

(Continued)

*Primary Examiner*—Darren W. Ark
(74) *Attorney, Agent, or Firm*—The Webb Law Firm

(57) ABSTRACT

A fishing lure comprises an elongated body with a modified cylindrical shape having a first end, a second end, a bottom portion and a top portion. The fishing lure also includes an eye for attaching a fishing line thereto positioned in a central region of the first end of the elongated body, and a plurality of hooks attached to the bottom portion of the elongated body, the second end of the elongated body or any combination thereof. The fishing lure is adapted to rotate 90 degrees from an original position and descend from a surface of a body of water as a force from the fishing line is applied, and return to the original position and float to the surface of the body of water when the force is discontinued.

7 Claims, 4 Drawing Sheets

U.S. PATENT DOCUMENTS

| | | | |
|---|---|---|---|
| 3,456,378 A * | 7/1969 | Ul | 43/42.48 |
| 3,641,698 A * | 2/1972 | Varaney | 43/42.48 |
| 3,676,948 A * | 7/1972 | Hill | 43/42.45 |
| 3,716,937 A * | 2/1973 | Santosuosso | 43/42.32 |
| 3,727,339 A * | 4/1973 | Le Master | 43/42.22 |
| 3,942,280 A | 3/1976 | Ryder et al. | |
| 3,981,096 A * | 9/1976 | Toivonen | 43/42.39 |
| 3,982,349 A * | 9/1976 | Hills | 43/42.48 |
| 4,164,826 A * | 8/1979 | Metzler et al. | 43/42.48 |
| 4,182,067 A * | 1/1980 | Pfister et al. | 43/42.47 |
| 4,189,860 A * | 2/1980 | Ebert | 43/42.48 |
| 4,223,469 A * | 9/1980 | Luz | 43/42.39 |
| 4,305,220 A * | 12/1981 | Couillard | 43/42.48 |
| 4,602,452 A * | 7/1986 | Reid | 43/42.45 |
| 4,671,006 A * | 6/1987 | Schuyler, Jr. | 43/42.48 |
| 4,893,431 A * | 1/1990 | Ehlers | 43/42.49 |
| 5,097,621 A * | 3/1992 | Hnizdor | 43/42.32 |
| 5,381,623 A * | 1/1995 | Crisp | 43/42.48 |
| 5,450,689 A * | 9/1995 | Glick | 43/42.45 |
| 5,477,634 A * | 12/1995 | Welcome | 43/42.48 |
| 5,564,220 A * | 10/1996 | Blicha | 43/42.32 |
| 5,598,659 A * | 2/1997 | Vanorden | 43/42.45 |
| 5,638,632 A * | 6/1997 | Smith | 43/42.45 |
| 5,950,347 A | 9/1999 | McQueeny | |
| 6,035,574 A * | 3/2000 | Ware | 43/42.39 |
| 6,173,522 B1 * | 1/2001 | Couch | 43/42.32 |
| 6,430,867 B1 * | 8/2002 | Johnston et al. | 43/42.45 |
| 2001/0049900 A1 * | 12/2001 | Peck | 43/42.39 |
| 2004/0107628 A1 * | 6/2004 | Mueller | 43/42.39 |
| 2005/0178044 A1 * | 8/2005 | Stechschulte | 43/42.32 |

FOREIGN PATENT DOCUMENTS

| | | |
|---|---|---|
| DE | 2006002516 U1 * | 6/2006 |
| FR | 2690607 A1 * | 11/1993 |
| JP | 2003-250392 A * | 9/2003 |
| WO | WO-92/07462 A1 * | 5/1992 |

* cited by examiner

FISHING LURE

CROSS REFERENCE TO RELATED APPLICATIONS

This application claims the benefit of U.S. Provisional Patent Application No. 60/671,559 entitled "Fishing Lure" filed Apr. 14, 2005, which is hereby incorporated by reference in its entirety.

BACKGROUND OF THE INVENTION

1. Field of the Invention

The present invention relates, in general, to artificial fish lures and, more particularly, to a fish lure of the jerkbait type.

2. Description of Related Art

Heretofore, fish lures of the jerkbait type have been provided. For instance U.S. Pat. No. 2,525,733 to Suick discloses a fishing lure that comprises an elongated, tapered body having a distinctly wider head end than tail end. The lower side of the head end is recessed, and a plurality of multiple barbed hooks are suspended from the bottom of the body. A rearwardly extending strap and a separate, rearwardly extending tail piece are secured in the tail end of the body. A screw is threaded through the distal end of the strap and engages the upper surface of the tail piece whereby the angle of inclination of the tail piece can be varied to control the weaving and diving movement of the bait as it is drawn through water.

U.S. Pat. No. 4,182,067 to Pfister et al. discloses a fish lure comprising an elongated, rearwardly tapering body portion having a head end and a tail end, and a plurality of hooks extending from the bottom thereof. The body portion has a bottom recess formed at its head end which provides a water engaging surface for imparting a life-like action to the lure as it is drawn through water by a line attached to the head end of the lure. The tail end of the body portion is provided with a thin, flat, flexible tail-like diving fin which can be bent upwardly or downwardly, as desired, to regulate the depth at which the lure dives through water as the lure is retrieved, as by a jerking action, through water.

U.S. Pat. No. 4,305,220 to Couillard discloses a fishing lure having an elongated tailing portion with a flat belly behind a much shorter head portion. The head portion includes a longitudinal arcuate recess on its underside and a transverse arcuate recess in its upper side. The head portion further includes a nose protruding to extend below the line of the flat belly. In operation, when a fishing line connected to the fishing lure is jerked, the fishing lure will exhibit a diving motion.

However, the lures described above suffer from a variety of drawbacks. For instance, such lures display one or more of the following motions when retrieved at the end of a fishing line with a jerk and pause motion: darting with a zig-zag, wobble or erratic motion, diving and floating to the water surface while the retrieve is paused. These actions are often difficult to control, haphazard in nature and determined to a degree by the random positions the lure occupies when a forward jerk occurs. Therefore, there is a high degree of unpredictability in the motion that will be exhibited by the lure.

Additionally, anglers often use live small baitfish such as minnows when fishing for larger fish such as muskies and pike. It is not unusual, when utilizing minnows or other baitfish as bait, to allow the water in which the minnows are being stored to become depleted of oxygen. The minnows held in a container with a very low dissolved oxygen level will become afflicted with the sickness of oxygen depravation and will begin floating on their sides at the top of the container. When disturbed, these minnows will instinctively right themselves and swim to the perceived safety of the bottom of the container. In their weakened state, they will be unable to maintain their position at the bottom of the container and will involuntarily roll to their sides and float to the surface.

Accordingly, a need exists for a fish lure that has a more predictable action during retrieval. A further need exists for a fish lure that is designed to mimic a sick or injured baitfish.

SUMMARY OF THE INVENTION

The present invention is directed to a fishing lure of the jerk-bait type. The fishing lure comprises an elongated body with a modified cylindrical shape having a first end, a second end, a bottom portion and a top portion. The elongated body includes a head portion and a tail portion. The head portion comprises a first plane and a second plane formed in the elongated body. The first plane and the second plane meet at the first end of the elongated body. The tail portion comprises a tapered cylindrical shape beginning at a posterior end of the head portion and ending at the second end of the elongated body. The fishing lure also includes an eye for attaching a fishing line thereto positioned in a central region of the first plane of the head portion, and a plurality of hooks attached to the bottom portion of the elongated body, the second end of the elongated body or any combination thereof. The fishing lure is adapted to rotate 90 degrees from an original position and descend from a surface of a body of water as a force from the fishing line is applied, and return to the original position and float to the surface of the body of water when the force is discontinued.

The fishing lure may further include at least one weight which is positioned in the head portion of the elongated body at the bottom portion thereof. The plurality of hooks may be single hooks, double hooks, triple hooks or any combination thereof. Desirably, a surface of the top portion of the elongated body is provided with a dark color, and a surface of the bottom portion of the elongated body is provided with a light color. The elongated body may be fabricated from fiberglass, wood, plastic, aluminum or any combination thereof.

The present invention is also directed to a method of fishing. The method comprises the steps of providing a fishing lure, attaching a fishing line through an eye of the fishing lure, casting the fishing lure attached to the fishing line into a body of water, applying a force to the fishing line thereby causing the fishing lure to rotate 90 degrees from an original position and descend from a surface of the body of water and discontinuing the application of the force to the fishing line thereby allowing the fishing lure to return to the original position and float to the surface of the body of water. The fishing lure comprises an elongated body with a modified cylindrical shape having a first end, a second end, a bottom portion and a top portion. The elongated body includes a head portion and a tail portion. The head portion comprises a first plane and a second plane formed in the elongated body. The first plane and the second plane meet at the first end of the elongated body. The tail portion comprises a tapered cylindrical shape beginning at a posterior end of the head portion and ending at the second end of the elongated body. The fishing lure also includes an eye for attaching a fishing line thereto positioned in a central region of the first plane of the head portion, and a plurality of hooks attached to the bottom portion of the elongated body, the second end of the elongated body or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1:
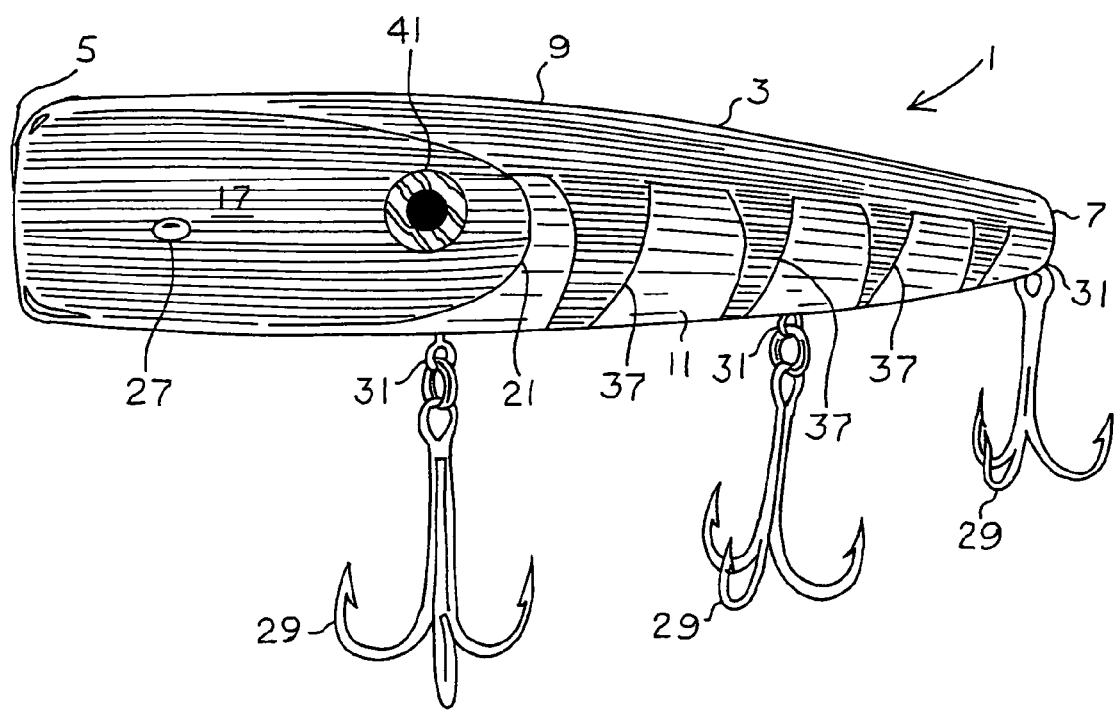
FIG. 1 is a perspective view of a fishing lure in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
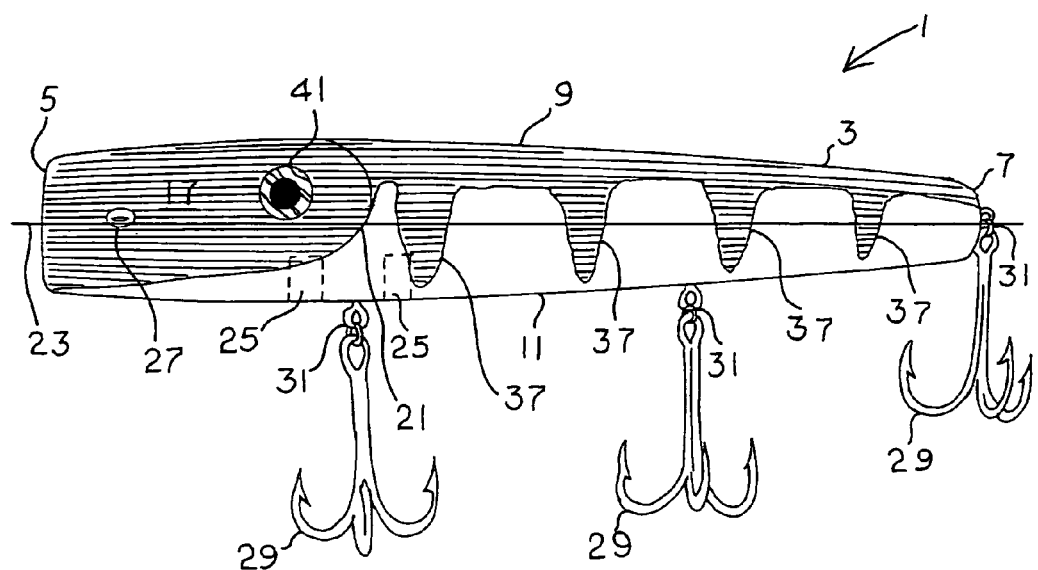
FIG. 2 is a side plan view of a fishing lure in accordance with the present invention.
Figure 3:
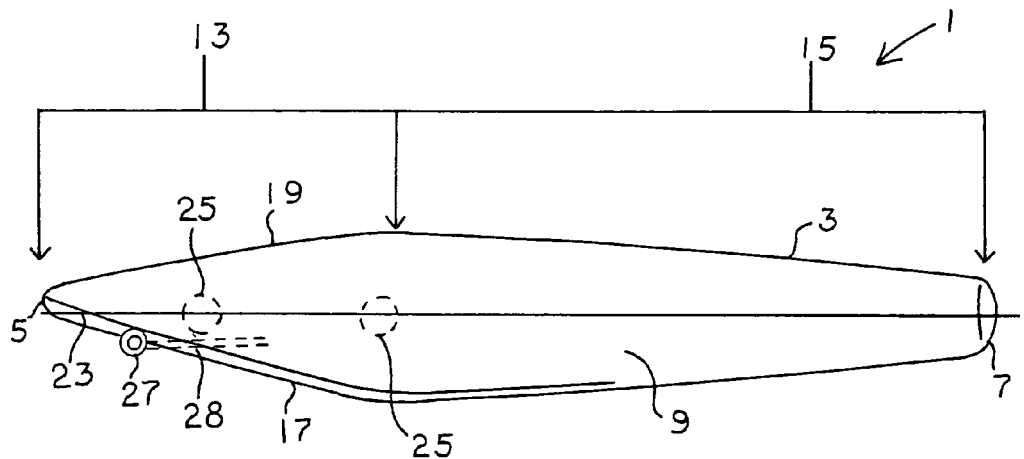
FIG. 3 is a top plan view of the fishing lure in accordance with the present invention.

With reference to FIGS. 1-3, a fishing lure, denoted generally as reference numeral 1, comprises an elongated body 3 with a modified cylindrical shape having a first end 5, a second end 7, a bottom portion 11 and a top portion 9. Elongated body 3 includes a head portion 13 and a tail portion 15. Head portion 13 comprises a first plane 17 and a second plane 19 formed in elongated body 3. First or dive plane 17 and second or relief plane 19 meet at first end 5 of elongated body 7. Tail portion 15 has a tapered cylindrical shape beginning at a posterior end 21 of head portion 13 and ending at second end 7 of elongated body 3. Head portion 13 comprises approximately one third of elongated body 3 and tail portion comprises approximately two thirds of elongated body 3. Elongated body 3 is symmetrical about a longitudinal axis 23. Elongated body 3 is fabricated from any suitable material including, but not limited to, fiberglass, wood, plastic, aluminum or the like. At least one lead weight 25 (shown in phantom) is positioned in head portion 13 of elongated body 3 at bottom portion 11 thereof. Lead weights 25 are positioned perpendicular to longitudinal axis 23 of elongated body 3 in a plane parallel to longitudinal axis 23.

Fishing lure 1 also comprises an eye 27 for attaching a fishing line thereto. Eye 27 is positioned in a central region of first plane 17 of head portion 13. The position of eye 27 dictates the manner in which fishing lure 1 will dive as will be discussed in further detail hereinafter. Eye 27 may be attached to head portion 13 of elongated body 3 through any suitable attachment means, such as a threaded connection device 28 (shown in phantom).

A plurality of hooks 29 are attached to bottom portion 13 of elongated body 3 and second end 7 of elongated body 3. Each of the plurality of hooks 29 is supported by an attachment device 31, thereby allowing hooks 29 to be suspended from bottom portion 13 or second end 7 of elongated body 3 in a spaced relation with each other. Furthermore, while hooks 29 are illustrated in the figures as being treble hooks, this is not to be construed as limiting as the use of other types of hooks has been envisioned, such as single or double hooks.

Figure 4:
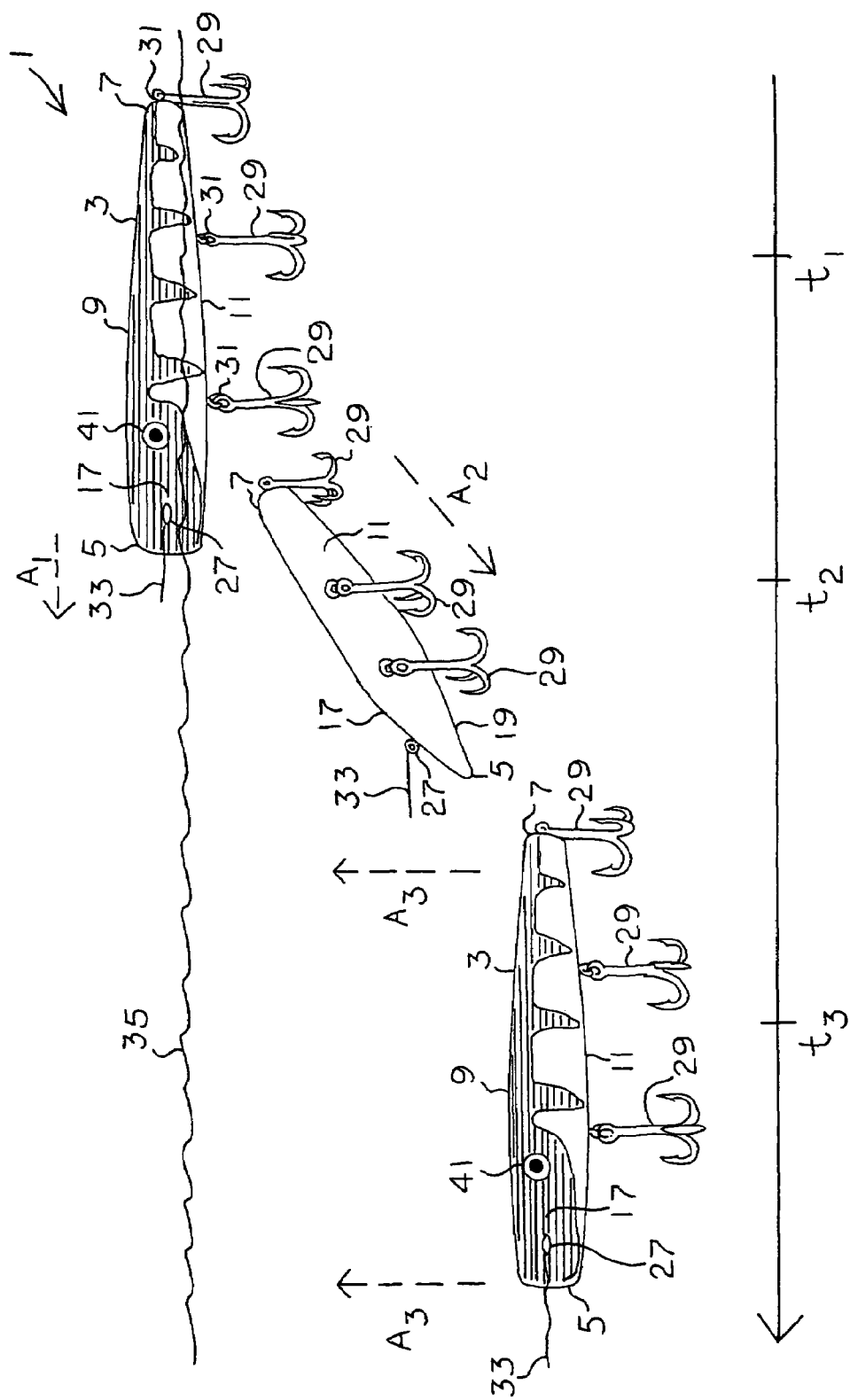
FIG. 4 is a diagrammatic view, on a reduced scale, of the unique action of the fish lure in accordance with the present invention when the fish lure is in the water.

With reference to FIG. 4 and with continuing reference to FIGS. 1-3, the operation of fishing lure 1 is as follows. First, fishing lure 1 is securely fastened to a fishing line 33 and cast into a body of water where it will float at the surface 35 of the body of water. At time $t_1$, an angler will provide a force on fishing line 35 in the direction of arrow $A_1$. Water pressure is thereby exerted on first or dive plane 17 causing fishing lure 1 to rotate 90 degrees from an original position and dive in the direction of arrow $A_2$ at time $t_2$. The intersection of first plane 17 with second plane of head portion 13 of elongated body 13 partially controls the angle of descent. The angle of descent is also controlled by the location of eye 27 on first plane 17. The more posterior on first plane 17 eye 27 is located, the steeper the angle of descent. The location of attachment of eye 27 on first plane 17 is the reason fishing lure 1 rotates approximately ninety degrees during the dive. Second or relief plane 19 lessens water resistance and aids in the diving ability of fishing lure 1 when the angler provides a force on fishing line 33. At time $t_3$, the angler discontinues the application of a force on fishing line 33, thereby causing fishing lure 1 to return to the original position and float to the surface 35 of the body of water in the direction of arrow $A_3$. Lead weights 25 cause fishing lure 1 to rerotate when the force on fishing line 33 is discontinued, and are used to attain a desirable specific gravity which allows control of the rate of ascent in the direction of arrow $A_3$ of fishing lure 1 at time $t_3$. Fishing lure 1 is desirably painted with top portion 9 having a color that contrasts with bottom portion 11 as will be discussed in greater detail hereinafter. When fishing lure 1 is provided with such a coloring scheme, the rotation of fishing lure 1 when diving shifts the location of the painted surface thereby creating a flash. This flash is similar to the flash displayed by a sick or injured baitfish that has rolled on its side.

Figure 5:
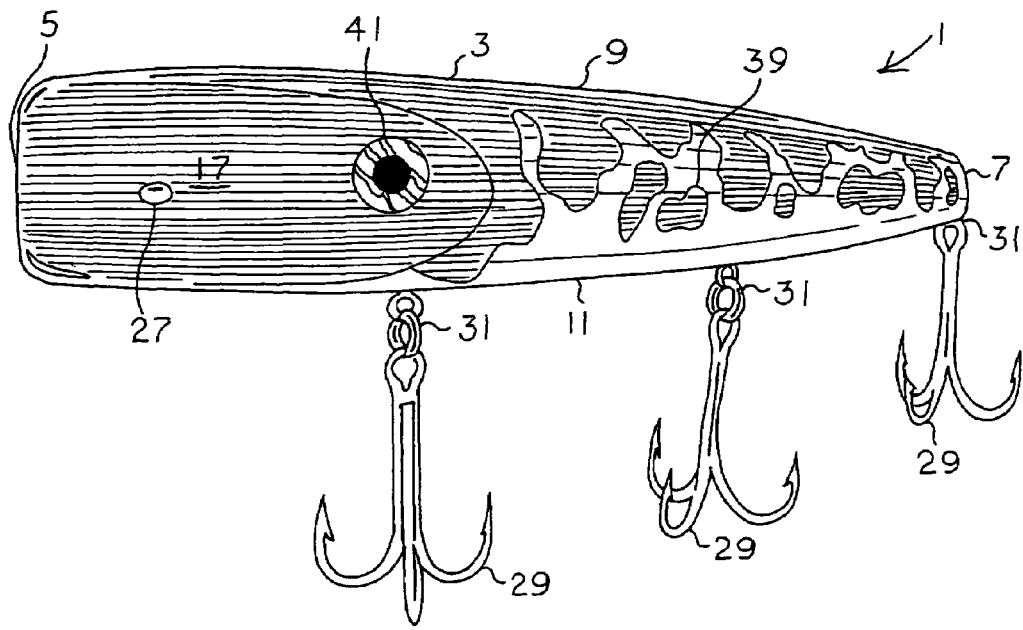
FIG. 5 is a perspective view of a fishing lure in accordance with a second embodiment of the present invention.
Figure 6:
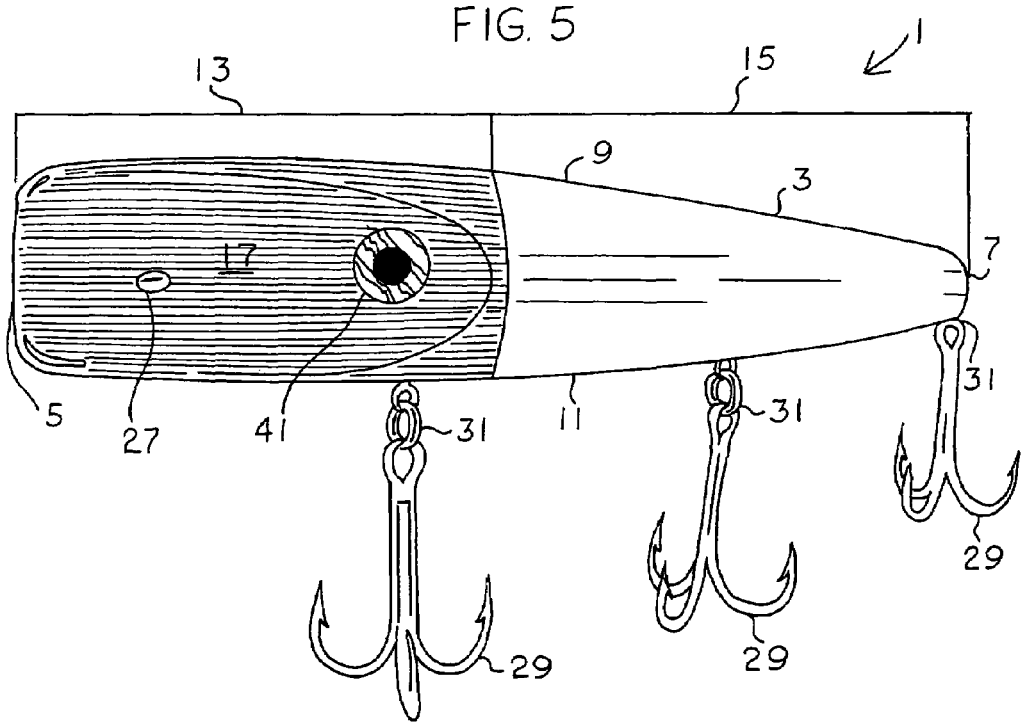
FIG. 6 is a perspective view of a fishing lure in accordance with a third embodiment of the present invention.

With reference to FIGS. 5 and 6 and with continuing reference to FIGS. 1-3, the manner in which fishing lure 1 is colored is discussed in greater detail. In nature, baitfish, such as minnows, will often have a dark colored back and a light colored belly. Coloring of this type aids the baitfish in survival because a light object is difficult to see from the bottom of a body of water and a dark object is difficult to see from the top of a body of water. Accordingly, fishing lure 1 of the present invention has been colored with this basic scheme. With reference to FIGS. 1-3, fishing lure 1 may be colored with stripes 37 of a darker color on top portion 9 and then have a solid lighter colored bottom portion 11. With reference to FIG. 5, fishing lure 1 may be colored with a dark colored spot pattern 39 on top portion 9 and a solid lighter colored bottom portion 11. With reference to FIG. 6, fishing lure 1, may be colored with head portion 13 having a dark color and tail portion 15 having a substantially lighter color. A decal 41 representing an eye of the baitfish may also be provided on first plane 17 and second plane 19 of head portion 13 of elongated body 3.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A fishing lure comprising:
   an elongated body with a modified cylindrical shape having a first end, a second end, a bottom portion having a bottom surface and a top portion having an uninterrupted, continuous top surface, the elongated body having a head portion and a tail portion, the head portion comprising a first plane, having a first end and a second end, and a second plane, having a first end and a second end, formed on the elongated body, the first plane and the second plane positioned on lateral sides of the elongated body and comprised of substantially flat surfaces meeting at the first end of the elongated body, and the tail portion comprising a tapered cylindrical shape beginning at a posterior end of the head portion and ending at the second end of the elongated body;
   an eye for attaching a fishing line thereto fixedly and immovably secured in a central region of the first plane of the head portion;
   at least one weight positioned between the first end and the second end of each of the first plane and the second plane of the head portion of the elongated body, the at least one weight having first and second ends defining a longitudinal axis therebetween which is perpendicular to a longitudinal axis of the elongated body, the at least one weight first end being at the bottom surface of the bottom portion of the elongated body, and the at least one weight extending from the first end into the elongated body toward the second end which is located less than half of a distance between the top and bottom surfaces; and
   a plurality of hooks attached to the bottom portion of the elongated body, the second end of the elongated body or any combination thereof,
   wherein the fishing lure is adapted to rotate 90 degrees from an original position and descend from a surface of a body of water as a force from the fishing line is applied, and return to the original position and float to the surface of the body of water when the force is discontinued.

2. The fishing lure of claim 1, wherein the plurality of hooks are single hooks, double hooks, triple hooks or any combination thereof.

3. The fishing lure of claim 1, wherein the top surface of the top portion of the elongated body is provided with a dark color.

4. The fishing lure of claim 1, wherein the bottom surface of the bottom portion of the elongated body is provided with a light color.

5. The fishing lure of claim 1, wherein the elongated body is fabricated from fiberglass, wood, plastic, aluminum or any combination thereof.

6. The fishing lure of claim 1, wherein the elongated body has a length from about 4 inches to about 12 inches.

7. A method of fishing comprising the steps of:
   a) providing a fishing lure comprising:
      i) an elongated body with a modified cylindrical shape having a first end, a second end, a bottom portion having a bottom surface and a top portion having an uninterrupted, continuous top surface, the elongated body having a head portion and a tail portion, the head portion comprising a first plane, having a first end and a second end, and a second plane, having a first end and a second end, formed on the elongated body, the first plane and the second plane positioned on lateral sides of the elongated body and comprised of substantially flat surfaces meeting at the first end of the elongated body, and the tail portion comprising a tapered cylindrical shape beginning at a posterior end of the head portion and ending at the second end of the elongated body;
      ii) an eye for attaching a fishing line thereto fixedly and immovably secured in a central region of the first plane of the head portion;
      iii) a plurality of hooks attached to the bottom portion of the elongated body, the second end of the elongated body or any combination thereof; and
      iv) at least one weight positioned in between the first end and the second end of the first plane and the second plane of the head portion of the elongated body, the at least one weight having first and second ends defining a longitudinal axis therebetween which is perpendicular to a longitudinal axis of the elongated body, the at least one weight first end being at the bottom surface of the bottom portion of the elongated body, and the at least one weight extending from the first end into the elongated body toward the second end which is located less than half of a distance between the top and bottom surfaces;
   b) attaching a fishing line through the eye of the fishing lure;
   c) casting the fishing lure attached to the fishing line into a body of water;
   d) applying a force to the fishing line thereby causing the fishing lure to rotate 90 degrees from an original position and descend from a surface of the body of water; and
   e) discontinuing the application of the force to the fishing line thereby allowing the fishing lure to return to the original position and float to the surface of the body of water.

* * * * *